Feb. 3, 1959
S. S. MATTHES
2,872,522
OVERHEAD TROLLEY CROSSING
Filed July 9, 1953
3 Sheets-Sheet 1
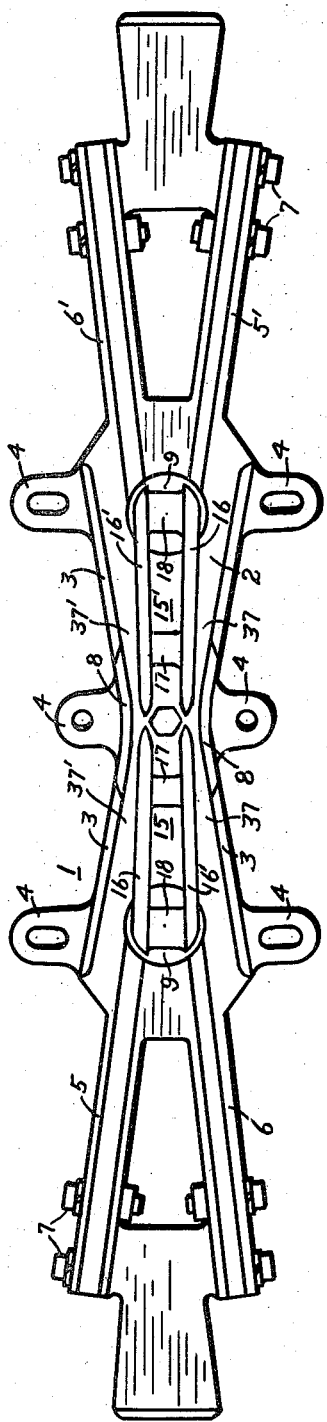
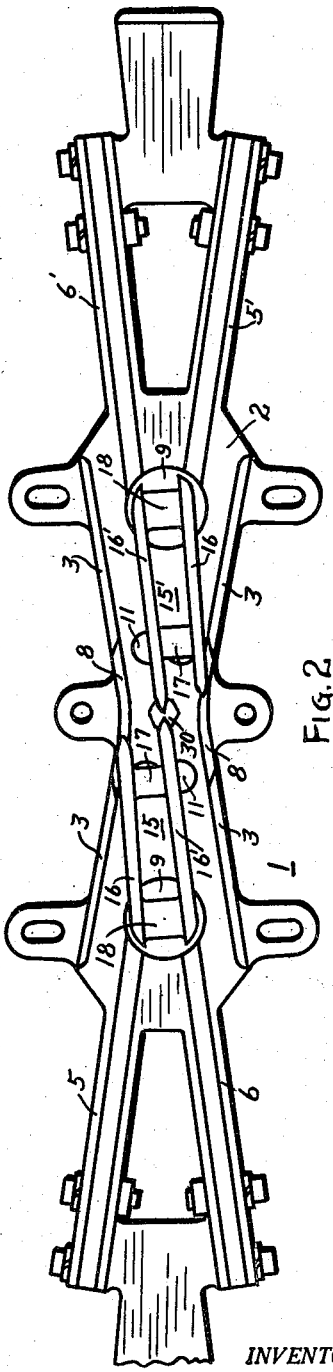
INVENTOR.
Samuel S. Matthes
BY
ATTORNEY.

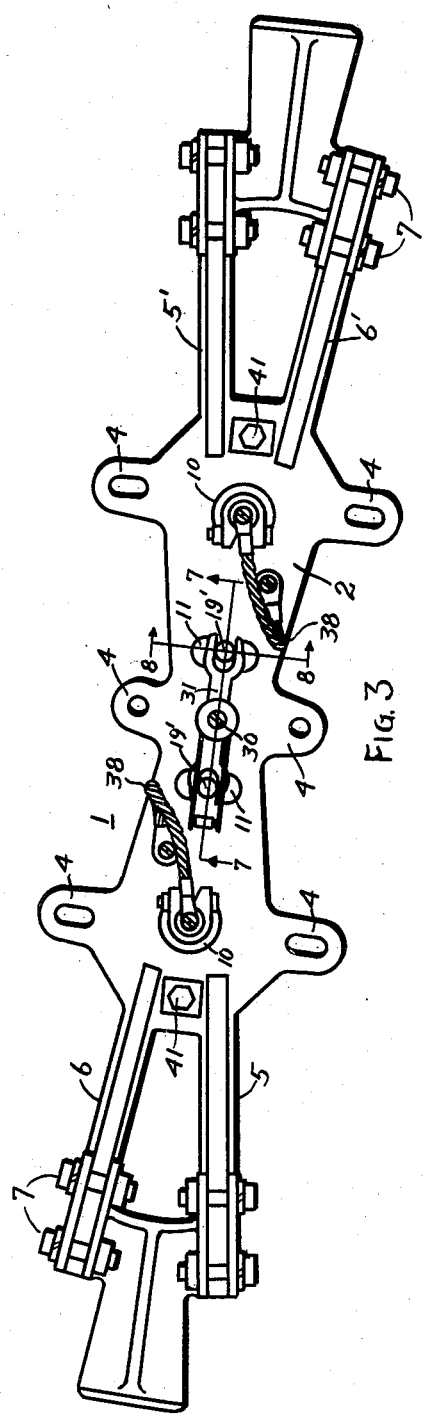
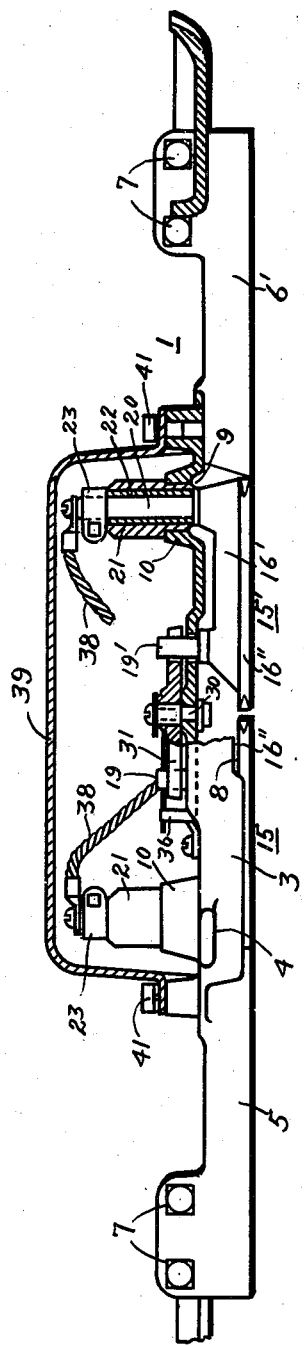

Feb. 3, 1959 S. S. MATTHES 2,872,522
OVERHEAD TROLLEY CROSSING
Filed July 9, 1953 3 Sheets-Sheet 3
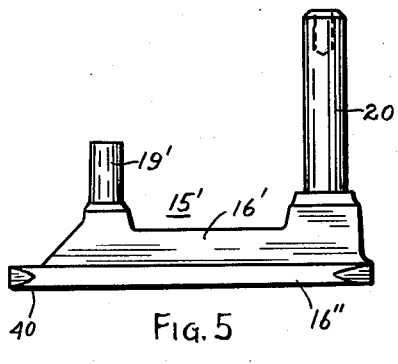
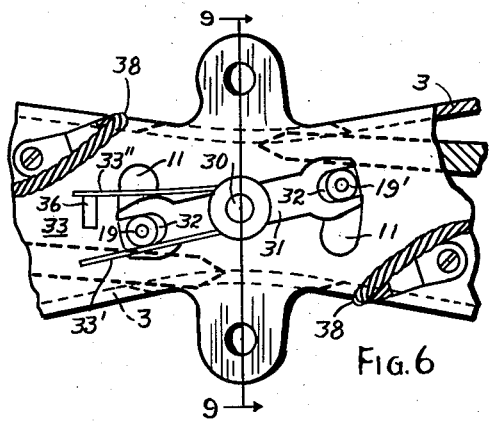
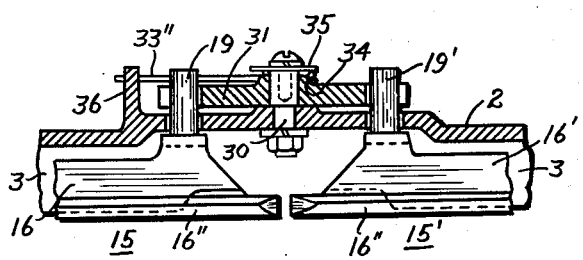
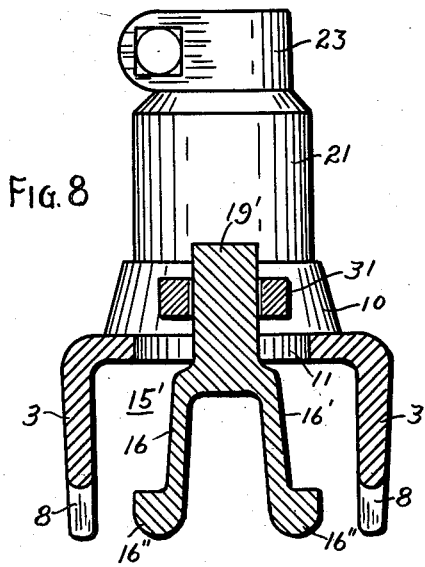
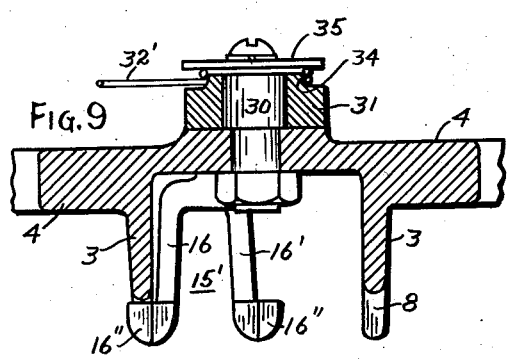
INVENTOR.
BY
ATTORNEY.

United States Patent Office 2,872,522
Patented Feb. 3, 1959

2,872,522

OVERHEAD TROLLEY CROSSING

Samuel S. Matthes, Mansfield, Ohio, assignor to The Ohio Brass Company, Mansfield, Ohio, a corporation of New Jersey Application July 9, 1953, Serial No. 366,889

5 Claims. (Cl. 191—37)

This invention relates to a crossover or crossing for a pair of trolley wires, the angle of crossing being fixed.

One of the principal objects of this invention is to provide a device having a straight and smooth underrun for guiding the current collector in passing through the crossing along each set of runners.

Another object is to provide a device in which the current collector is guided by its groove along each set of runners when passing in either direction through the crossing.

Another object is to provide a crossover device in which movable bridging members are held in a neutral position except when shifted by the current collector in making a crossing.

Another object is to provide means to effect the movement of the bridging members in the proper direction by the current collector just prior to the collector passing the center of the crossing and such means to prove effective until the collector hsa passed onto the aligned bridging member.

Another object is to provide operating means for the crossover bridging members which is simple and effective and which acts adjacent the free end of the runners of the bridging member in place of adjacent the pivotal end of the bridging members thus requiring a minimum amount of force to move the bridging members.

For a further understanding of this invention reference may be had to the following specification and accompanying drawings in which—

Fig. 1 is a bottom plan view of a crossover embodying the present invention with the bridging members in their neutral position.

Fig. 2 is a view of the crossover of Fig. 1 in which the bridging members have been shifted to guide a current collector along one set of runners.

Fig. 3 is a top plan view of the crossover of Fig. 1.

Fig. 4 is a side view in partial section of the crossover of Figs. 1 and 3, and includes a cover not shown in Figs. 1 and 3.

Fig. 5 is an enlarged side view of the bridging members.

Fig. 6 is an enlarged top view of the central portion of Fig. 2.

Fig. 7 is an enlarged side view in partial section of the central portion of Fig. 4 taken on the line 7—7 of Fig. 3.

Fig. 8 is an enlarged sectional view taken on the line 8—8 of Fig. 3 with the bridging member in neutral position.

Fig. 9 is an enlarged sectional view taken on the line 9—9 of Fig. 6.

In Figs. 1 and 2, the pan 1 comprises a body provided with the top wall 2 and the depending side walls or flanges 3 and strain eyes 4 for receiving supporting cables. Two pairs of oppositely disposed fixed runners 5—5' and 6—6' project from the top wall and extend inwardly along the top wall for a short distance and are U-shaped with lower rounded guide edges. The U-shaped runners are provided with through bolts 7 to secure to the ends of the runners, tip members (not shown) to which the trolley wires are attached.

The flanges 3 are of less height for a distance along their length as shown at 8 (Figs. 4, 8 and 9) for the purpose later explained.

The bridging members 15—15' comprise a pair of guide runners 16—16' which are shown as practically parallel, however if the angle of crossing is sufficiently great, the angle between the guide runners will depend upon the angle between the fixed runners 5—6 and 5'—6'. The spread of the ends of the guide runners adjacent the inner ends should be the same so that the guide runners will align with the fixed runners. The guide runners are held in spaced and fixed relation by cross members 17 and 18 adjacent the upper edges of the rails.

From each member 17 projects an integral pin 19—19' and from each cross member 18 projects an integral support stud or pivot 20. The lower or enlarged guide edge 16" of the guide runners 16—16' may have any cross sectional shape to meet requirements.

Each of the bridging members is supported from the pan 1 of the crossover by means of the pivot 20 which extends through an opening 9 in the pan. A boss 10, which is integrally formed on the upper side of the pan 1 about the opening 9, supports a sleeve 21 which carries a bearing bushing 22 within which the pivot 20 is received. Identical arrangements are provided for each of the bridging members 15 and 15'. The bridging members are positioned in the vertical direction by the lower ends of the sleeve 21 and the bushing 22 which bear against the cross piece 18 of the bridging member and by the collar 23 which is clamped upon the pivot 20 at the upper end of the sleeve and bushing. The bridging members 15 pivot freely in the bushings 22 although the movement is very slight.

The studs 19—19' project through the oblong openings 11 in the top wall of the pan 1 and the openings are of such length that when the bridging member has moved to either of its guiding positions (Figs. 2 and 9) the stud will not quite contact the end walls of the opening.

The construction of the pan and of the bridging members is such that the lower surface of the portions 16" of the guide members will be in longitudinal alignment with themselves and with the lower surface of the runners 5—5' and 6—6', when the bridging members have moved to either of their operated positions, thereby giving the current collector a smooth and straight guiding surface from runner to runner.

In order to yieldingly hold the bridging members in their neutral position and return them automatically to their neutral positions, the crossover is provided with a reversing link means operatively interconnecting the bridging members including a lever 31 engaged with the pins 19 and 19'.

The lever 31 is pivotally mounted at its longitudinal center on the stud 30, arranged centrally between the pins 19 and 19', and the slots 32 are equally spaced from the pivot formed by the stud 30 and are so arranged as to receive the pins 19—19' projecting through the openings 11 in the top wall 2 of the body. The arrangement just described is such that when the lever is pivoted to either of its side positions the pins 19—19' are moved and at the same time the associated bridging members are moved but in opposite directions; that is, if the bridging member 15' moves in either direction, the bridging member 15 will move in the opposite direction (Fig. 2) bringing one of the runners of each bridging member into alignment with the alternate runner of the remaining bridging member and also into alignment with one of the fixed runners 5—5' and 6—6' (Fig. 2).

In order to yieldingly hold the bridging members normally in their neutral or intermediate position (Fig. 1), a two armed spring 33, in which the arms 33' and 33" are connected by a single turn or coil, loosely surrounds a boss 34 at the center of the lever 31 and the spring is held against displacement by the washer 35 (Figs. 7 and 9).

A lug 36 forms an integral projection on the center line of the pan 1 and is sufficiently high for the arms 33' and 33" of the spring 33 to engage. The width of the lug 36 and the spread of the arms 33' and 33" are such that when the tongues are in their neutral position (Fig. 1), each arm will bear lightly against the opposite faces of the pin 19 and almost engage the sides of the lug 36. The tension in each arm is sufficient, however, to insure that the bridging members are yieldingly held in their neutral positions under normal conditions.

When the bridging member 15' is moved to the position shown in Fig. 2, with the pin 19' of the bridging member 15' acting on the lever 31, the latter will take the position shown in Fig. 6. If the force moving the bridging member 15' is removed the increase of tension in the arms 33' and 33" will act upon the pin 19 and in turn force the pin 19 and bridging members 15—15' back to their normal positions in which the arm 33' will assume its normal portion (Fig. 3) relative to the stud 36 and the spring pressure upon the pin 19 will be the same on the opposite sides of the pin. The diameter of the pins 19 and 19' is a little greater than the width of the lug 36, and the spring tension in the arms 33' and 33" can be increased by reducing the normal spread between the arms. The spring being held loosely on the boss 34, the tension in the arms 33' and 33" will always be equal under all conditions and held against rotation by one arm engaging the lug 36 when the bridging members are moved to either guiding position.

In order to automatically operate the bridging members to either of their guiding positions to permit a current collector to pass through the crossing, the flanges 3 are concaved for a predetermined distance along the flanges from the longitudinal center portion of the pan; the flanges being concave to an extent such that the normal longitudinal space 37—37' between the runners 16—16' and the adjacent inner vertical surface of the flange 3 will be tapered. Hence, when the flange of a grooved current collector moves into one of the said spaces from either end of the pan, the bridging members will be forced from their neutral positions into one or the other of the guiding positions since the bridging members are movable and the flanges 3 are fixed. When the leading end of the current collector (of a sliding shoe type) reaches a point about opposite the stud 19—19' depending upon the direction of travel, the collector flange will begin to crowd the bridging member from its neutral position, and this wedging action of the flange will continue as the collector moves further toward the center of the pan. When the front end of the collector reaches the front or free ends of the bridging members, the bridging members will have moved laterally at least sufficiently in opposite directions for the operating flange on the collector to pass between the rails 16—16' of the other bridging member. Thus the collector will pass onto the proper runner of the other bridging member and then onto the proper runner.

In order that the passage of the current collector from the first tongue onto the second bridging member is accomplished without any interference should the runners of the bridging members not quite align due to a difference in the thickness of the flange of different collectors, the free ends of the runners are tapered in opposite directions, as in Fig. 2.

To further insure that the collector flange performs its function, the sides of the flanges 3 are slotted or reduced in height, as at 8, to permit extra side movement of the bridging members. The overlapping relation of the runners 16—16' to the flange 3 in the slot 8 is shown in Figs. 2, 6 and 9.

The proper operation of the bridging members 15—15' is further assured by making the width between the vertical inner faces of the flanges 3 adjacent the longitudinal center of the pan, or in other words, adjacent the inner ends of the bridging members, sufficient to allow the current collector or shoe to pass freely from the guide runners of one bridging member to the guide runners of the other bridging member.

The spread of the runners at the inner ends of each bridging member and the space between the runners and the adjacent face of the flanges and the space between the inner faces of the flange adjacent the inner ends of the bridging members must be so related that either flange of the current collector will effect movement of the bridging members until the proper runners align and the spread between the flanges being sufficient to permit the passing of the collector from one bridging member onto the other without binding.

In order to insure a sufficient current path to the bridging members 15—15', a jumper cable 38 connects the stud 20 on each bridging member directly to the pan.

The body portion is provided with a cover 39 which protects the lever 31 and spring 33 from the elements and is held to the body by bolts 41.

Having described the invention I claim:

1. A crossover for electric trolleys, comprising an elongated body, four metallic runners fixed to the underside of the body and arranged in longitudinally aligned pairs spaced apart at the inner ends thereof and the longitudinal axes of the two pairs of runners crossing at an acute angle between the inner ends of the runners and means at the outer ends of the fixed runners for securing trolley conductors thereto, two bridging members, each comprising a pivot extending upwardly through the body adjacent the inner ends of the fixed runners at one end of the body, and a pair of spaced guide runners carried at the lower extremity of the pivot, the guide runners of the bridging members being spaced apart a distance substantially equal to the spacing of the adjacent fixed runners of the two pairs at the inner ends thereof, and each extending substantially to the middle part of the space between the fixed runners to bridge the space and carry a trolley collector from one to the other of the fixed runners of a pair in either of two aligned positions of the bridging members, bearing means on the body for each of the bridging members with the pivots received therein for supporting the bridging members to turn into alignment with either of the pairs of fixed runners, reversing means operatively interconnecting the bridging members for imparting a reverse movement to either of the bridging members upon movement of the remaining bridging member to bring both bridging members into alignment with one of the pairs of fixed runners, and spring means operatively actuated by the said bridging members and coacting with means fixed on the body to normally maintain both bridging members in a neutral position intermediate the aligned positions.

2. The invention in accordance with claim 1 in which the interconnecting means comprises a pin on each of the bridging members projecting upwardly through a slot in the body adjacent the inner end of the runners of the bridging member, a lever with a pivot therefor on the body at the upper side thereof between the pins and forked ends on the lever received over the pins for transmitting movement of either of the bridging members to the remaining bridging member in the opposite direction therefrom.

3. The invention in accordance with claim 2 in which the spring means comprises two spring arms extending from the lever pivot outwardly on opposite sides of one of the pins and an abutment affixed to the body projecting upwardly between the springs in alignment with the pins in the neutral position thereof.

4. A crossover for electric trolleys, comprising an elongated body, four metallic runners fixed to the underside of the body and arranged in longitudinally aligned pairs spaced apart at the inner ends thereof and the longitudinal axes of the two pairs of runners crossing at an acute angle between the inner ends of the runners and means at the outer ends of the fixed runners for securing trolley conductors thereto, two bridging members, each comprising a pivot extending upwardly through the body adjacent the inner ends of the fixed runners at one end of the body, a pair of spaced guide runners carried at the lower extremity of the pivot and a pin projecting upwardly from the guide runners adjacent the inner end thereof, the guide runners of the bridging members being spaced apart a distance substantially equal to the spacing of the adjacent fixed runners of the two pairs at the inner ends thereof, and each extending substantially to the middle part of the space between the fixed runners to bridge the space and carry a trolley collector from one to the other of the fixed runners of a pair in either of two aligned pairs of bridging members, a supporting boss with bearing means for the pivot of each of the bridging members on the body and arcuate slots in the body through which the pins project, a lever pivotally supported by the body between the projecting pins and forked ends on the lever disposed on opposite sides of each of the pins for transmitting movement of either pin to the remaining pin oppositely in either direction, spring means operatively actuated by the bridging members and coacting with means fixed on the body for normally maintaining the bridging members in a neutral position, and depending flanges along the underside of the body spaced outwardly from the fixed runners and bridging members and directed generally toward the center part of the body for engagement by a trolley collector to move the guide runners from the neutral position into an aligned position with the fixed runner along which the collector is moving.

5. A crossover for electric trolleys, comprising an elongated body, four metallic runners fixed to the underside of the body and arranged in longitudinally aligned pairs spaced apart at the inner ends thereof and the longitudinal axes of the two pairs of runners crossing at an acute angle between the inner ends of the runners and means at the outer ends of the fixed runners for securing trolley conductors thereto, two bridging members, each comprising a pivot extending upwardly through the body adjacent the inner ends of the fixed runners at one end of the body, a pair of spaced guide runners carried at the lower extremity of the pivot and a pin projecting upwardly from the guide runners adjacent the inner end thereof, the guide runners of the bridging members being spaced apart a distance substantially equal to the spacing of the adjacent fixed runners of the two pairs at the inner ends thereof, and each extending substantially to the middle part of the space between the fixed runners to bridge the space and carry a trolley collector from one to the other of the fixed runners of a pair in either of two aligned pairs of bridging members, a supporting boss with bearing means for the pivot of each of the bridging members and arcuate slots through which the pins project, a lever and a pivot therefor supported by the body between the projecting pins and forked ends on the lever disposed on opposite sides of each of the pins for transmitting movement of either pin to the remaining pin oppositely in either direction, spring means carried on the lever pivot comprising two spring arms extending along the lever on opposite sides of one of the pins, an abutment affixed to the body projecting upwardly between the springs in alignment with the pins in the neutral position thereof, all for normally maintaining the bridging member in a neutral position, and depending flanges along the underside of the body spaced outwardly from the fixed runners and bridging members and directed generally toward the center part of the body for engagement by a trolley collector to move the guide runners from the neutral position into an aligned position with the fixed runner along which the collector is moving.

References Cited in the file of this patent

UNITED STATES PATENTS

| 1,438,690 | Bogdanski | Dec. 12, 1922 |
| 1,465,308 | Matthes | Aug. 21, 1923 |
| 2,099,494 | Matthes | Nov. 16, 1937 |

FOREIGN PATENTS

| 940,162 | France | Dec. 6, 1948 |
| 256,755 | Germany | Aug. 31, 1948 |
| 438,571 | Great Britain | Nov. 19, 1935 |
| 589,991 | Great Britain | July 4, 1947 |
| 207,039 | Switzerland | Sept. 15, 1939 |